F. Myers,

Nut Lock.

No. 108,382.    Patented Oct. 18. 1870.

Witnesses:
Daniel F. Myers
Gus H. Leonhardt

Inventor:
Frederick Myers

United States Patent Office.

FREDERICK MYERS, OF NEW YORK, N. Y.

Letters Patent No. 108,382, dated October 18, 1870.

IMPROVEMENT IN NUT-FASTENINGS.

The Schedule referred to in these Letters Patent and making part of the same.

*To all whom it may concern:*

Be it known that I, FREDERICK MYERS, of the city of New York, in the county and State of New York, have invented a new and useful Improvement in Nut-Fastener; and I do hereby declare that the following is a full, clear, and exact description of the same, reference being had to the accompanying drawing and to the letters of reference marked thereon, wherein—

Figure 1:
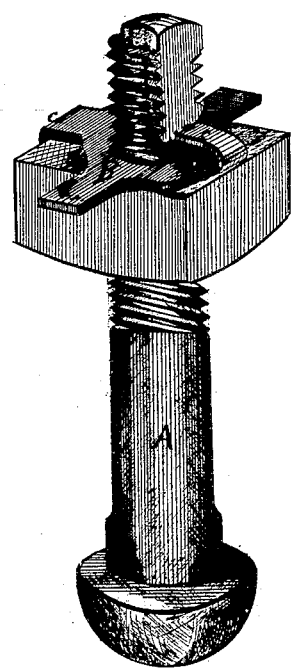
Figure 1 is a perspective view of the bolt and key-piece.
Figure 2:
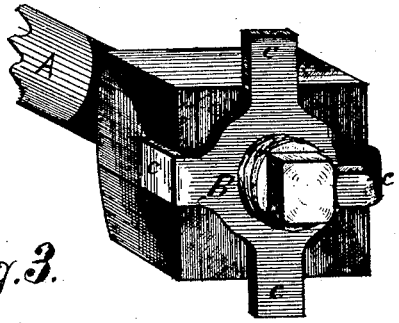
Figure 2 is a perspective front view of the same.
Figure 3:
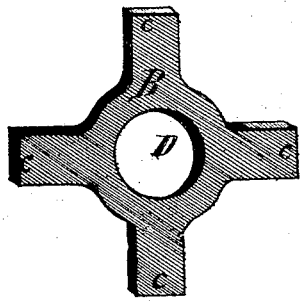
Figure 3 is a perspective view of the key-piece.

My invention relates to the combination of a bolt and key-piece in such a manner that the said key-piece shall be capable of firmly holding and locking the nut, to prevent it from loosening from the bolt when the nut has been rotated into the required position.

A is a bolt, differing only from common bolts in having a portion of one side made flat, and having a square formed on the point of the screw.

B is the key-piece, provided with projections $c\ c\ c\ c$, and a round hole, D; the said key-piece may be constructed of any suitable metal.

The hole D is made so as to screw down on the thread of the bolt.

The projections $c\ c\ c\ c$ are constructed of any length to suit the size of the nut. The nut having been rotated into the required position, the key-piece B is then rotated down on the thread of the bolt, until it comes in contact with the nut, having one of the projections $c\ c\ c\ c$ opposite the flat side of the bolt A, or opposite the flat sides of the square formed on the point of the screw, both of which may be used.

The nut and key-piece having been rotated into the required position, one of the projections $c\ c\ c\ c$, being opposite the flat side of the bolt or square, is bent over, so that the point comes in contact with the flat surface of the bolt, which prevents the key-piece from turning, and the upper surface of the nut coming in contact with the key-piece, prevents the nut from turning, thus forming a complete lock to the nut.

When it is desired to unscrew the nut, or to take up any slack that may occur, the projection $c$, resting against the flat surface of the bolt, is bent back, so as to free the key-piece, when the nut may be rotated to any required position; and to lock it, bend it back as before.

Having thus fully described my invention,

What I claim, and desire to secure by Letters Patent, is—

The key-piece B, provided with projections $c\ c\ c\ c$, the hole D, in combination with the bolt A, constructed and operated substantially as shown and specified.

FREDERICK MYERS.

Witnesses:
 DANIEL F. MYERS,
 GUS. H. LEONHARDT.